(12) United States Patent
Blaski et al.

(10) Patent No.: US 11,092,184 B2
(45) Date of Patent: Aug. 17, 2021

(54) INSTALLATION AND DESIGN OF A RIVNUT

(71) Applicant: GM GLOBAL TECHNOLOGY OPERATIONS LLC, Detroit, MI (US)

(72) Inventors: Bradley Blaski, Sterling Heights, MI (US); Richard C. Janis, Grosse Pointe Woods, MI (US); Pei-chung Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 200 days.

(21) Appl. No.: 16/139,536

(22) Filed: Sep. 24, 2018

(65) Prior Publication Data

US 2020/0096032 A1 Mar. 26, 2020

(51) Int. Cl.
*F16B 19/10* (2006.01)
*F16B 5/04* (2006.01)

(52) U.S. Cl.
CPC ............ *F16B 19/1072* (2013.01); *F16B 5/04* (2013.01)

(58) Field of Classification Search
CPC ...... F16B 19/1072; F16B 5/04; F16B 35/044; F16B 37/067; F16B 11/006
See application file for complete search history.

(56) References Cited

U.S. PATENT DOCUMENTS

| | | | | |
|---|---|---|---|---|
| 5,403,135 | A * | 4/1995 | Renner | B25B 27/0007 29/525.06 |
| 7,857,563 | B2 * | 12/2010 | Pratt | F16B 29/00 411/34 |
| 9,897,125 | B2 * | 2/2018 | Blaski | F16B 19/08 |
| 9,903,402 | B2 * | 2/2018 | Faguer | F16B 19/1072 |
| 9,926,963 | B2 * | 3/2018 | Diehl | B29C 65/562 |
| 10,385,899 | B2 * | 8/2019 | Germann | B21J 15/147 |
| 2004/0247412 | A1 | 12/2004 | Reck et al. | |
| 2007/0243035 | A1 * | 10/2007 | Pratt | F16B 31/021 411/15 |
| 2015/0125201 | A1 * | 5/2015 | Diehl | B29C 66/721 403/280 |
| 2015/0377272 | A1 * | 12/2015 | Faguer | F16B 37/067 29/515 |
| 2016/0341234 | A1 * | 11/2016 | Germann | F16B 5/04 |
| 2017/0335876 | A1 * | 11/2017 | Blaski | F16B 5/04 |
| 2018/0214934 | A1 | 8/2018 | Wang et al. | |

FOREIGN PATENT DOCUMENTS

CN 102829056 A 12/2012

* cited by examiner

*Primary Examiner* — Lawrence Averick

(57) ABSTRACT

A rivet nut ("rivnut") installation method and a rivnut structural configuration are disclosed that can be implemented separately in conjunction with one another to serve as an anchor in and/or a workpiece at an installation location. The rivnut installation method involves inserting a rivnut onto an externally threaded mandrel, rotating the mandrel while a free end of the mandrel is in contact with the workpiece, and driving the free end of the mandrel and the rivnut through the workpiece while continuing to rotate the mandrel. The method is particularly useful when the workpiece includes one or more substrate layers composed of a low ductility material such as a polymer composite. The rivnut structural configuration includes the incorporation of an external threading onto at least a portion of a hollow shaft of the rivnut.

10 Claims, 3 Drawing Sheets

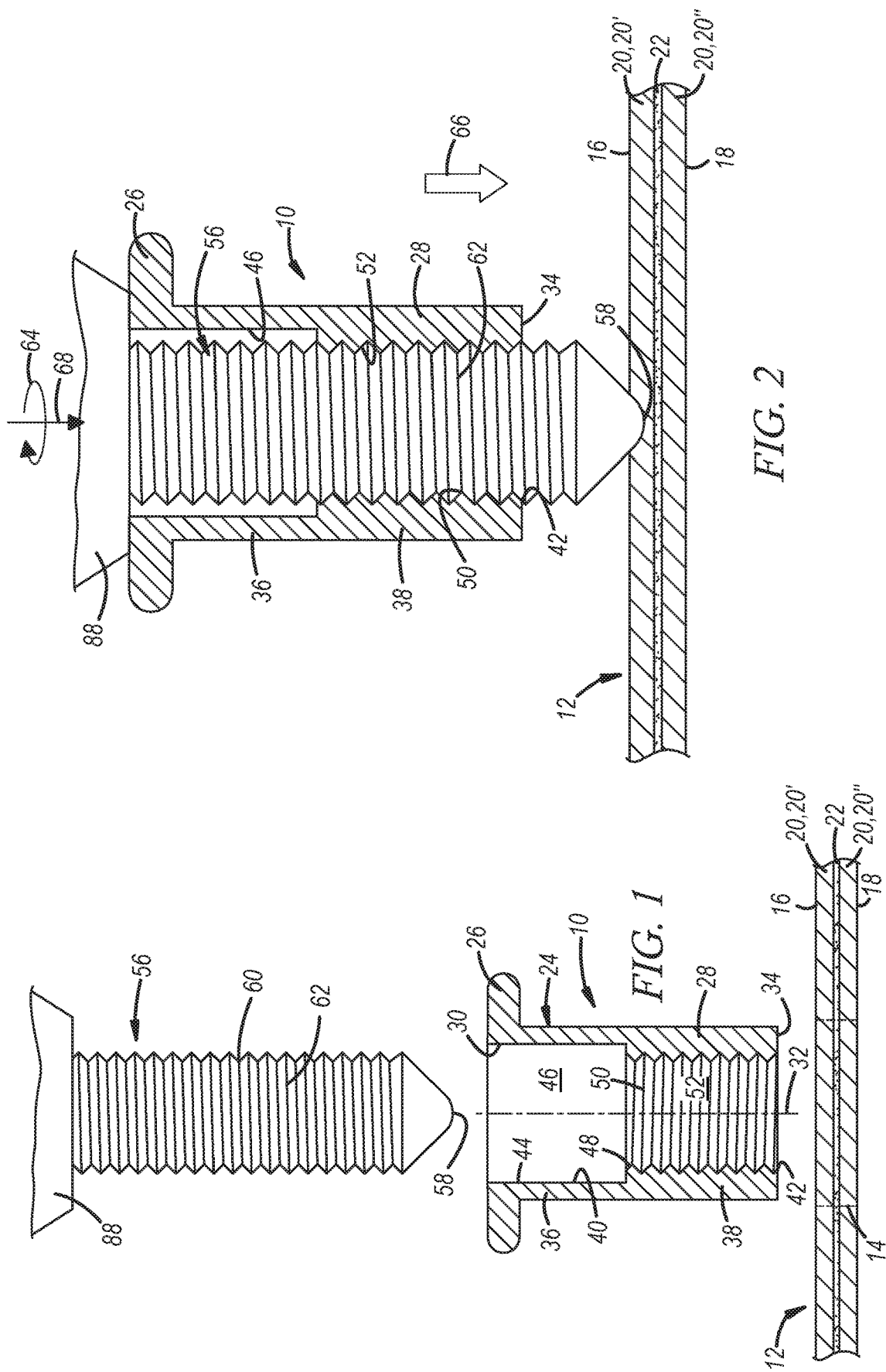

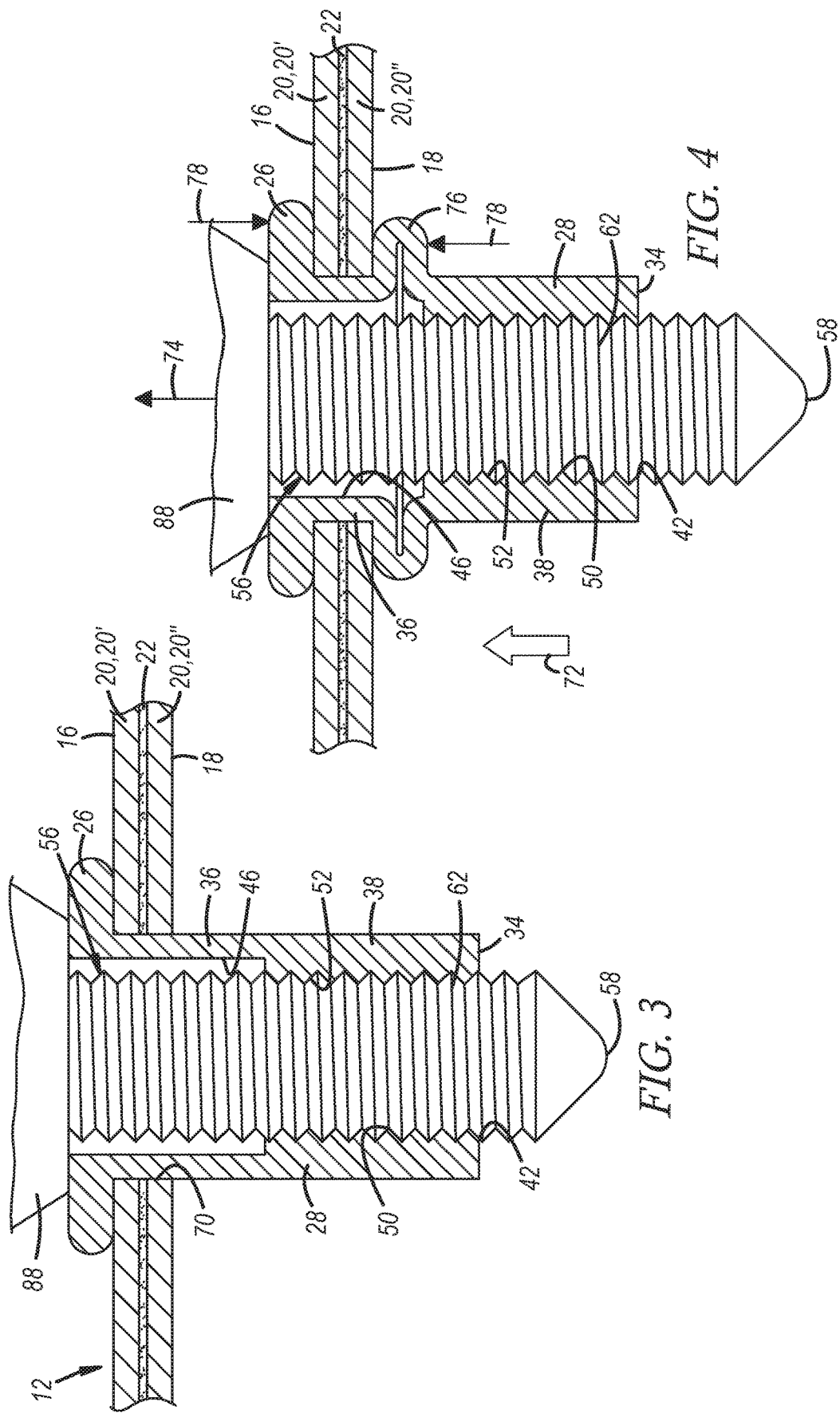

INSTALLATION AND DESIGN OF A RIVNUT

INTRODUCTION

A rivet nut, or "rivnut" for short, is a blind fastener that can be securely affixed in a workpiece that includes a single substrate layer or an assembly of two or more overlapping substrate layers while requiring only single-side access to the workpiece. A conventional rivnut comprises a hollow shaft and a head. The hollow shaft includes a counterbored upper wall portion and an internally threaded lower wall portion. The head surrounds the counterbored upper wall portion and typically includes a flat or countersunk flange. In operation, the internally threaded lower wall portion of the rivnut shaft is inserted through a pre-formed hole in the workpiece. An externally threaded mandrel is then passed through the counterbored upper wall portion and rotated into threaded engagement with the internally threaded lower wall portion. Once engaged, the mandrel is pulled in a direction opposite to the insertion direction while the rivnut head is held firmly against the front side of the workpiece. This "upsetting" causes the counterbored upper wall portion of the rivet shaft collapse and form a radially outwardly extending bulge behind and against the back side of the workpiece. The flange and the upset bulge mechanically lock the rivnut in place while exerting a compressive force against the opposite sides of workpiece.

A rivnut can be used to fasten together a wide variety of workpieces. The workpiece may be a single substrate layer or an assembly of one or more similar or dissimilar substrate layers that are often stacked-up in overlapping fashion with the aid of an intervening adhesive layer. However, when a substrate layer of the workpiece is a polymer composite, a ceramic, or some other brittle material with a low ductility of 3% elongation or less that has a restricted ability to deform under load, the installation of a rivnut can cause localized damage to the workpiece. Specifically, the brittleness of the low ductility substrate layer combined with the compressive force applied to the workpiece during rivnut installation can induce cracking of the substrate layer and/or delamination of the substrate layer within the surrounding vicinity of the installed rivnut. Such localized cracking and/or delamination can reduce the locking capacity of the installed rivnut and negatively impact the structural integrity of the final product.

The present disclosure provides a rivnut structural configuration and a rivnut installation method that are particularly useful in conjunction with a workpiece that includes one or more substrate layers composed of a relatively brittle material. The disclosed rivnut installation method involves driving the rivnut through the workpiece while softening the substrate layer(s) with frictionally-generated heat, and the disclosed rivnut structural configuration involves incorporating an external threading onto the hollow shaft of the rivnut. Each of the rivnut structural configuration and the rivnut installation method enables the rivnut to be installed in a workpiece that includes one or more brittle substrate layers without causing localized damage in the form of cracking or delamination or, at the very least, mitigating the adverse consequences of any such damage if it occurs. The disclosed rivnut structural configuration and rivnut installation method are preferably implemented together, but do not necessarily have to be under all circumstances in order to achieve satisfactory rivnut performance in terms of mechanical anchoring or fastening depending on the application.

SUMMARY OF THE DISCLOSURE

A method of installing a rivet nut according to one embodiment of the present disclosure includes several steps. In one step, a workpiece is provided that has a front side and an opposed back side and includes one or more substrate layers at an installation location. In another step, an externally threaded mandrel is inserted through a hollow shaft of a rivet nut to establish a threaded engagement between the externally threaded mandrel and an internally threaded bore defined by a lower wall portion of a hollow shaft of the rivet nut. The hollow shaft of the rivet nut further includes an upper wall portion extending between a head of the rivet nut and the lower wall portion of the hollow shaft. Additionally, a leading end of the externally threaded mandrel extends through the hollow shaft of the rivet nut and protrudes beyond a free end of the hollow shaft.

In still another step, the mandrel is rotated together with the rivet nut while the leading end of the mandrel that protrudes beyond the free end of the hollow shaft of the rivet nut is in contact with the front side of the workpiece at the installation location. In yet another step, the leading end of the mandrel is driven into and through the workpiece in an insertion direction while continuing to rotate the mandrel until a hole is formed through the workpiece and the head of the rivet nut engages the front side of the workpiece. And, in still another step, the mandrel is retracted in a reverse direction opposite the insertion direction while the head of the rivet nut is held against the front side of the workpiece to collapse the upper wall portion of the rivet nut into a radially outwardly extending bulge that bears on the back side of the workpiece. The head of the rivet nut and the radially outwardly extending bulge exert a compressive force against the workpiece at the installation location.

The aforementioned method may include additional steps or be further defined. For example, each of the upper wall portion and the lower wall portion of the hollow shaft may have an exterior surface, and at least a portion of the exterior surface of the upper wall portion may be in the form of an external threading. And, in one particular implementation, each of the exterior surface of the upper wall portion and the exterior surface of the lower wall portion may be in the form of a helical external threading so as to define a single continuous helical external threading extending all the way from the head to the free end of the hollow shaft. In another example, the head of the rivet nut may comprise a flat or countersunk flange that surrounds and extends radially outwardly from the hollow shaft. Furthermore, the leading end of the mandrel may be radially inwardly tapered.

The construction of the workpiece recited in the aforementioned method may take on a variety of forms. In one implementation, the workpiece may be a single substrate layer composed of a low ductility material having an elongation of less than 3%. The single substrate layer may, for example, be composed of a polymer composite that comprises a thermoplastic resin polymer matrix reinforced with embedded fibers. In another implementation, the workpiece may include two or more overlapping substrate layers at the installation location. At least one of those two or more overlapping substrate layers may be composed of a low ductility material having an elongation of less than 3%. Indeed, each of the two or more overlapping substrate layers may be composed of the low ductility material. Under those circumstances, all of the two or more overlapping substrate layers may be composed of a polymer composite that comprises a thermoplastic resin polymer matrix reinforced with embedded fibers.

A method of installing a rivet nut according to another embodiment of the present disclosure includes several steps. In one step, a workpiece is provided that has a front side and an opposed back side and includes one or more substrate layers composed of a low ductility material at an installation location. The low ductility material has an elongation of less than 3%. In another step, an externally threaded mandrel is inserted through a hollow shaft of a rivet nut so that a leading end of the externally threaded mandrel protrudes beyond a free end of the hollow shaft. The rivet nut further includes a head from which the hollow shaft extends. The hollow shaft comprises an upper wall portion that extends from the head of the rivet nut and a lower wall portion that extends from the upper wall portion to the free end of the hollow shaft. The lower wall portion of the hollow shaft defines an internally threaded bore and establishes a threaded engagement with the externally threaded mandrel. Additionally, each of the upper wall portion and the lower wall portion of the hollow shaft has an exterior surface, and at least a portion of the exterior surface of the upper wall portion is in the form of an external threading.

In another step, the mandrel is rotated together with the rivet nut while the leading end of the mandrel that protrudes beyond the free end of the hollow shaft of the rivet nut is in contact with the front side of the workpiece at the installation location. In still another step, the leading end of the mandrel is driven into and through the workpiece in an insertion direction while continuing to rotate the mandrel until a hole is formed through the workpiece and the head of the rivet nut engages the front side of the workpiece. To that end, the external threading of the hollow shaft of the rivet nut interlocks with the workpiece as the rivet nut rotates and is moved through the hole formed through the workpiece. Consequently, the one or more substrate layers composed of a low ductility material are heated and softened as the leading end of the mandrel is driven therethrough. And, in yet another step, the mandrel is retracted in a reverse direction opposite the insertion direction while the head of the rivet nut is held against the front side of the workpiece to collapse the upper wall portion of the rivet nut into a radially outwardly extending bulge that bears on the back side of the workpiece. The head of the rivet nut and the radially outwardly extending bulge exert a compressive force against the workpiece at the installation location.

The aforementioned method may include additional steps or be further defined. For example, each of the exterior surface of the upper wall portion and the exterior surface of the lower wall portion may be in the form of a helical external threading so as to define a single continuous helical external threading extending all the way from the head to the free end of the hollow shaft. As another example, the workpiece may be a single substrate layer composed of a low ductility material, or the workpiece may include two or more overlapping substrate layers with at least one of the two or more overlapping substrate layers being composed of a low ductility material. The low ductility material may be a polymer composite that comprises a thermoplastic resin polymer matrix reinforced with embedded fibers. In one implementation, the thermoplastic resin polymer matrix may be nylon and the reinforcement fibers embedded in the thermoplastic resin polymer matrix may comprise at least one of carbon fibers, graphene fibers, or glass fibers.

A rivet nut for installation in a workpiece at an installation location is also described in the present disclosure and may be installed by any suitable installation procedure. The rivet nut includes a head and a hollow shaft. The head defines a central opening about an axis of rotation, and the hollow shaft extends along the axis of rotation from the head to an opposed free end of the shaft. The hollow shaft further comprises an upper wall portion and a lower wall portion. The upper wall portion extends from the head partway to the free end of the hollow shaft, and the lower wall portion extends from the upper wall portion to the free end of the shaft. The upper wall portion has an interior surface that defines a counterbore and the lower wall portion has an interior surface in the form of a threading that defines an internally threaded bore. The counterbore communicates with the central opening of the head and the internally threaded bore communicates with the counterbore. Moreover, each of the upper wall portion and the lower wall portion of the hollow shaft has an exterior surface, and at least a portion of the exterior surface of the upper wall portion is in the form of an external threading. The aforementioned rivet nut may include additional structural features or be further defined. For instance, each of the exterior surface of the upper wall portion and the exterior surface of the lower wall portion may be in the form of a helical external threading so as to define a single continuous helical external threading extending all the way from the head to the free end of the hollow shaft. In another implementation, the head may comprise a flat or countersunk flange that surrounds and extends radially outwardly from the hollow shaft.

BRIEF DESCRIPTION OF THE DRAWINGS

FIG. 1 is a cross-sectional view of a rivet nut and a side elevational view of the externally threaded mandrel, which are separately positioned above but not in contact with a workpiece, in accordance with one aspect of an installation method set forth in the present disclosure;

FIG. 2 is a cross-sectional view of the rivet nut and a side elevational view of the externally threaded mandrel depicted in FIG. 1 although here the rivet nut and the externally threaded mandrel are threaded together and a leading end of the mandrel that protrudes beyond a free end of the rivet nut is placed in rotational contact with a front side of the workpiece in accordance with one aspect of an installation method set forth in the present disclosure;

FIG. 3 is a cross-sectional view of the rivet nut and a side elevational view of the externally threaded mandrel after the rivet nut has been rotatably driven through the workpiece and a head of the rivet nut is seated against the front side of the workpiece in accordance with one aspect of an installation method set forth in the present disclosure;

FIG. 4 is a cross-sectional view of the rivet nut and a side elevational view of the externally threaded mandrel after the rivet nut has been deformed or upset against a back side of the workpiece by retraction of the mandrel in accordance with one aspect of an installation method set forth in the present disclosure;

DETAILED DESCRIPTION

Figure 6:
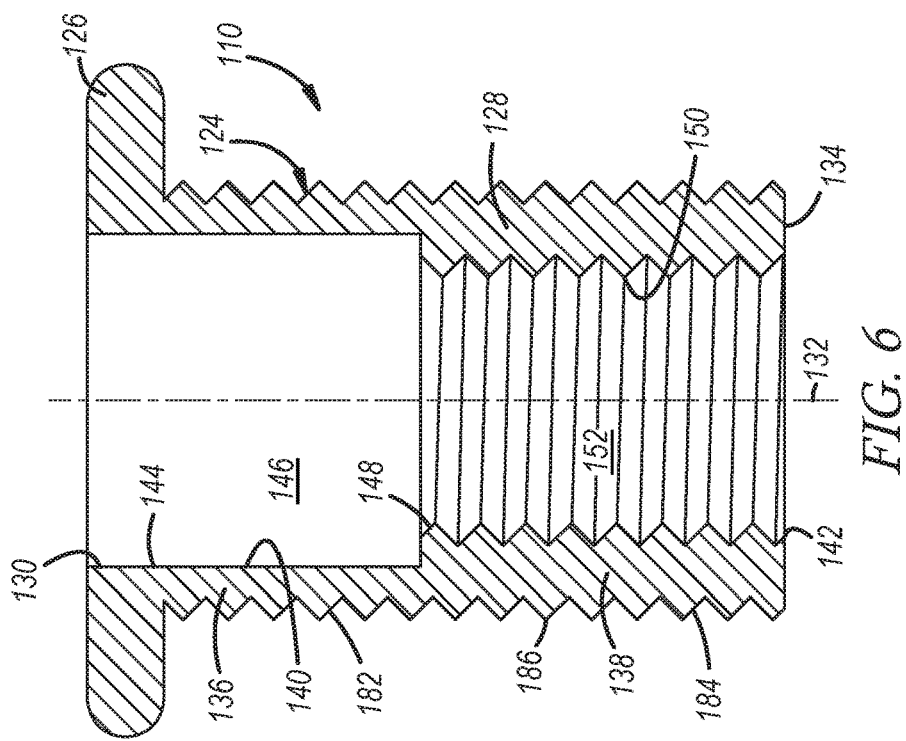
FIG. 6 is an elevated cross-sectional view of another implementation of the rivet nut according to an alternative embodiment of the present disclosure.

A rivnut installation method and a rivnut structural configuration are disclosed that can be implemented separately or, preferably, in conjunction with one another, to moreeffectively fasten a workpiece that includes one or more substrate layers composed of a relatively brittle material such as a polymer composite. Each of the rivnut installation method and the rivnut structural configuration are designed to inhibit the occurrence of debilitating cracking and delamination of the low ductility substrate layer(s) in the immediate surrounding vicinity of the installed rivnut. Referring now to FIGS. 1-5, the rivnut installation method is illustrated in which a rivnut 10 is installed in a workpiece 12 at an installation site 14. The workpiece 12 has a front side 16 and an opposed back side 18, which are outer uncovered surfaces of the workpiece 12, and includes at least one substrate layer 20. Here, the workpiece 12 is shown having two overlapping substrate layers 20—namely, a first substrate layer 20' and a second substrate layer 20"—but in other instances may include only a single substrate layer 20 or more than two overlapping substrate layers at the installation site 14. An adhesive layer 22 such as a 0.1 mm to 1.0 mm thick epoxy or polyurethane adhesive layer may optionally be allocated broadly between each pair of adjacent substrate layers 20 to set the layers 20 relative to each other. Each of the substrate layer(s) 20 is typically between 0.5 mm and 5.0 mm thick.

The substrate layer(s) 20 may assume a variety of compositions. The presently-disclosed rivnut installation method is particularly useful when the substrate layer 20 (if only one is present) or at least one of the substrate layers 20 (if more than one is present) in the workpiece 12 is composed of a material having a low ductility. A low ductility material is one that has an elongation (i.e., the percentage change in length before failure) of less than 3% as measured by force-displacement in static tensile testing. For example, in one implementation of a multi-substrate layer workpiece 12, all of the substrate layers 20 are composed of a low ductility material, meaning that in the specific embodiment shown in FIGS. 1-5 each of the first and second substrate layers 20', 20" is composed of a low ductility material. In another example, and again with regards to the workpiece 12 shown in FIGS. 1-5, either the first substrate layer 20' or the second substrate layer 20" may be composed of a low ductility material, while the other of the first substrate layer 20' or the second substrate layer 20" may be composed of another material such as aluminum or an aluminum alloy, titanium or a titanium alloy, or steel.

One specific low ductility material that may constitute the substrate layer(s) 20 of the workpiece is a polymer composite. A polymer composite comprises a thermoplastic resin polymer matrix reinforced with embedded fibers. The thermoplastic resin polymer matrix may be present in an amount that ranges from 95 wt. % to 30 wt. % and the embedded fibers, which are preferably distributed evenly throughout the thermoplastic resin polymer matrix, may be present in an amount that ranges from 5 wt. % to 70 wt. %. The ductility of the polymer composite may be relatively low, i.e., less than 3% elongation, as the reinforcing fibers tend to restrict the ability of the thermoplastic resin polymer matrix to deform under load. Preferably, the thermoplastic resin polymer matrix of the polymer composite may be a polyamide, such polycaprolactam (nylon 6) or polyhexamethylene adipamide (nylon 6,6), and the embedded fibers may be carbon fibers, graphene fibers, and/or glass fibers. Another specific low ductility material that may constitute the substrate layer(s) 20 of the workpiece is a ceramic.

Figure 5:
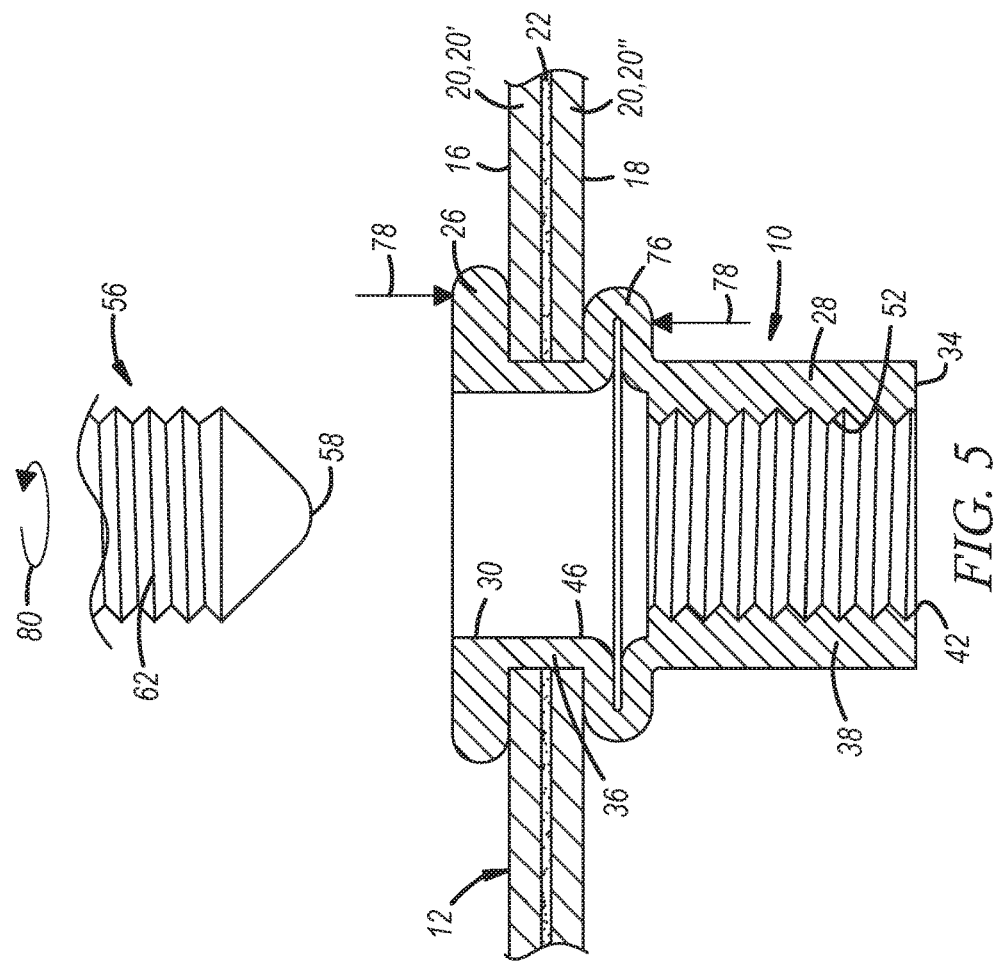
FIG. 5 is a cross-sectional view of the installed rivet nut after the externally threaded mandrel has been withdrawn from the rivet nut in accordance with one aspect of an installation method set forth in the present disclosure.

The rivnut 10 that is installed in the workpiece 12 is depicted in an initial extended state in FIG. 1. The rivnut 10 has a single-piece body 24 that includes a head 26 and a hollow shaft 28. The head 26 defines a central opening 30 about an axis of rotation 32, and the hollow shaft 28 extends along the axis of rotation 32 from the head 26 to an opposed free end 34 of the shaft 28. The head 26 surrounds and extends radially outwardly from the hollow shaft 28 and is preferably comprised of a flat (as shown) or countersunk flange. Additionally, the hollow shaft 28 comprises an upper wall portion 36 and a lower wall portion 38 positioned serially along the axis of rotation 32. The upper wall portion 36 extends from the head 26 partway to the free end 34 of the hollow shaft 28, typically about 25% to 40% of a length of the hollow shaft 28 along the axis of rotation 32, and the lower wall portion 38 extends from the upper wall portion 36 to the free end 34 of the hollow shaft 28. The upper wall portion 36 has a thickness that is less than a thickness of the lower wall portion 38 to facilitate the collapse or the rivnut 10 into a compressed state as shown in FIG. 5 and described in further detail below. The single-piece body 24 of the rivnut 10 may be constructed from any suitable material including, for example, steel, stainless steel, or aluminum or an aluminum alloy.

The hollow shaft 28 defines a passageway 40 that communicates with the central opening 30 of the head 26 and extends along the axis of rotation 32. The passageway 40 preferably extends entire through the hollow shaft 28 such that the shaft 28 defines a second central opening 42 about the axis of rotation 32 opposite the central opening 30. The passageway 40 includes two sections. Specifically, the upper wall portion 36 of the hollow shaft 28 has an interior surface 44 that defines a counterbore 46, and the lower wall portion 38 has an interior surface 48 in the form of a threading 50 that defines an internally threaded bore 52. The counterbore 46 communicates with the central opening 30 of the head 26 and preferably has the same cross-sectional size and shape as the central opening 30 when sectioned perpendicular to the axis of rotation 32. The internally threaded bore 52 communicates with the counterbore 46 and terminates at the second central opening 42 or close to it in those instances in which the passageway 40 does not extend entirely through the hollow shaft 28. The threading 50 provided by the interior surface 48 of the lower wall portion 38 is preferably a helical threading as shown here in FIG. 1.

The installation of the rivnut 10 is performed with the assistance of an externally threaded mandrel 56. The externally threaded mandrel 56 is a retractable spindle that includes a leading end 58, which, preferably, is radially inwardly tapered so as to assume a conical or frustoconical shape. At least a portion of an external surface 60 of the mandrel 56 is in the form of a threading 62 that is complementary to and rotatably engageable with the threading 50 that defines the internally threaded bore 52 of the hollow shaft 28 of the rivnut 10. The mandrel 56 is secured to a known tool 88 that, at the very least, can retract the mandrel 56 relative to the rivnut 10 while a threaded engagement is sustained between the external threading 62 of the mandrel 56 and the internal threading 50 of the hollow shaft 28 of the rivnut 10. The tool 88 may also be configured to rotate the mandrel 56 in both the clockwise and counterclockwise directions, if desired, but it does not necessarily have to equipped with that functionality. The operating tool 88 that secures the mandrel 56 may, for example, be a manually-operated hand tool or a hydro-pneumatic gun, both of which are known in the art. Preferably, in a manufacturing setting, the tool is a hydro-pneumatic gun that is mounted on a robot arm to allow for automated installation of the rivnut 10 as part of a larger manufacturing operation.

The rivnut installation method utilizes the externally threaded mandrel 56 to perform three operational tasks: (1)

to form a hole in the workpiece 12 that fully traverses a thickness of the workpiece 12 and, consequently, extends between the front side 16 and the opposed back side 18 of the workpiece 12; (2) to urge the rivnut 10 through the hole in the workpiece 12 while the hole is being formed; and (3) to collapse the rivnut 10 against the back side 18 of the workpiece 12 after the rivnut 10 is inserted into the hole and the head 26 is seated against the front side 16 of the workpiece 12 to thereby serve as an anchor for another fastener (e.g., a bolt) and, if multiple substrate layers 20 are present, to fasten the substrate layers 20 together at the installation location 14. By forming the hole within the workpiece 12 and pressing the rivnut 10 through the hole at the same time—as opposed to predrilling the hole and subsequently pressing a rivnut through the pre-formed hole—the substrate layers(s) 20 composed of a low ductility material are locally heated and softened around the rivnut 10 as the rivnut 10 is being urged through the workpiece 12 and then collapsed. This allows the low ductility material substrate layer(s) 20 to better withstand the compressive force applied to the workpiece 12 at the installation location 14 during collapse of the rivnut 10. To that end, cracking and/or delamination of the low ductility material substrate layer(s) 20 may be substantially reduced or altogether avoided during installation of the rivnut 10.

With reference to FIGS. 1-2, the rivnut installation method involves first inserting the externally threaded mandrel 56 through the passageway 40 of the hollow shaft 28 of the rivet nut 10 to establish a threaded engagement between the external threading 62 of the mandrel 26 and the internal threading 50 that defines internally threaded bore 52. This may be accomplished by receiving the leading end 58 of the mandrel 56 through the counterbore 46 and into the internally threaded bore 52, and then rotating the mandrel 56 and the rivnut 10 relative to one another. Such relative rotation engages the complimentary threadings 50, 62 and increases the extent of their engagement as the leading end 58 of the mandrel 56 progresses axially through the internally threaded bore 52. The mandrel 56 is inserted entirely through the internally threaded bore 52 and out of the second central opening 42 of the hollow shaft 28 of the rivnut 10. In this way, the leading end 58 of the mandrel 56 protrudes beyond the free end 34 of the hollow shaft 28 when the mandrel 56 is threadingly engaged with the hollow shaft 28.

After the rivnut 10 is supported on the externally threaded mandrel 56, and referring now to FIG. 2, the mandrel 56 is rotated in a first rotational direction 64 while the leading end 58 of the mandrel 56 is in contact with the front side 16 of the workpiece 12 at the installation location 14. Due to the threaded engagement between the hollow shaft 28 of the rivnut 10 and the mandrel 56, the rivnut 10 rotates together with the mandrel 56 about its axis of rotation 32 in the same rotation direction 64 at the same angular velocity. The rotational frictional contact experienced between the leading end 58 of the externally threaded mandrel 56 and the front side 16 of the workpiece 12 generates heat at the installation location 14. This heat softens the substrate layer 20 against which the leading end 58 of the mandrel 56 is rotating— here, the first substrate layer 20'—especially if that particular substrate layer 20 is composed of a low ductility material such as a polymer composite. The softening of the substrate layer 20 allows the leading end 58 of the mandrel 56 to being to penetrate into the layer 20 at the front side 16 of the workpiece 12. The initial penetration of the leading end 58 of the mandrel 56 can be aided by the radially inwardly tapered shape discussed above.

As the mandrel 56 is being rotated in the first rotational direction 64, the leading end 58 of the mandrel 56 is driven into and through the workpiece 12 in a linear insertion direction 66 by the application of an axial pressing force 68 to the mandrel 56, as depicted in FIG. 3. The continued penetration of the leading end 58 of the mandrel 56 forms a cavity that grows in the insertion direction 66. The rivnut 10 continues to rotate with the mandrel 56 and is thus forced through the workpiece 12 along with the mandrel 56. As such, the rivnut 10 and in particular the hollow shaft 28 of the rivnut 10 enlarges the diameter of cavity being created behind the pressing forward movement of the leading end 58 of the mandrel 56. The mandrel 56 is rotated and pressed forward in the insertion direction 66 until a hole 70 is formed through the workpiece 12 and the head 26 of the rivnut 10 engages and is seated against the front side 16 of the workpiece 12. The hole 70 extends through the workpiece 12 from the front side 16 to the back side 18 and conforms generally to the portion of the hollow shaft 28 of the rivnut 10 encircled by the workpiece 12. And, during the time the leading end 58 of the mandrel 56 is being driven through the workpiece 12 to form the hole 70, the substrate layers(s) 20 composed of a low ductility material are heated and softened due to the frictional heat generated by rotational contact with the leading end 58 and the hollow shaft 28 of the rivnut 10, which renders the low ductility material less rigid and more amenable to localized plastic deformation in the immediate surrounding vicinity of the hole 70.

Once the rivnut 10 is seated in place and the hollow shaft 28 extends through the hole 70 beyond the back side 18 of the workpiece 12, the rivnut 10 is deformed or "upset" behind the workpiece 12, as illustrated in FIG. 4, and thereby condensed from the initial extended state to the compressed state. During the upsetting process, the mandrel 56 is retracted in a reverse linear direction 72 opposite the insertion direction 66 while the head 26 of the rivnut 10 is held against the front side 16 of the workpiece 12 by the tool 88. To retract the mandrel 56, an axial tensile pulling force 74 is applied to the mandrel 56 without rotating the mandrel 56 relative to the rivnut 10, thus maintaining the threaded engagement between the external threading 62 of the mandrel 56 and the internal threading 50 of the hollow shaft 28 of the rivnut 10 during the application of the pulling force 74. The retraction of the mandrel 56 collapses the upper wall portion 36 of the hollow shaft 28 into a radially outwardly extending bulge 76 that bears on the back side 18 of the workpiece 12. As a consequence of this action, the head 26 of the rivnut 10 and the resultant radially outwardly extending bulge 76 exert a compressive force 78 against the workpiece 12 at the installation location 14. And, if the workpiece 12 includes multiple overlapping substrate layers 20, the compressive force 78 mechanically fastens the substrate layers 20 together.

While the retraction of the mandrel 56 collapses the upper wall portion 36 of the hollow shaft 28 as just described, the lower wall portion 38, which is threadingly engaged with the externally threaded mandrel 56, does not deform but instead maintains its original shape. This allows the externally threaded mandrel 56 to be withdrawn from the installed rivnut 10. In particular, as shown in FIG. 5, the mandrel 56 is withdrawn from the rivnut 10 by rotating the mandrel 56 in second rotational direction 80, which is the opposite of the first rotational direction 64. Because the rivnut 10 is mechanically locked in place within the workpiece 12, the rivnut 10 remains stationary during rotation of the mandrel 56. As a result, the leading end 58 of the mandrel 56 is extracted back through the internally threaded bore 52 in the reverse direction 72 and the threaded engagement between the threadings 50, 62 of the rivnut 10 and the mandrel 56 is eventually disengaged. The externally threaded mandrel 56 may now be positioned to another installation location 14 on the same workpiece 12 or a different assembly and method repeated with another rivnut 10.

The rivnut installation method described above in connection with FIGS. 1-5 may be performed with the conventional rivnut 10 or with a rivnut having a modified structural configuration as shown in FIG. 6 and identified by reference numeral 110. Only the material differences between the rivnut 110 illustrated in FIG. 6 and the rivnut 10 shown in FIGS. 1-5 will be described in further detail below. Any features of the rivnut 110 shown in FIG. 6 that correspond in structure and function to the rivnut 10 described above in connection with FIGS. 1-5 are identified with corresponding 100 series reference numerals. And, unless otherwise stated, the description of any features of the rivnut 10 shown in FIGS. 1-5 applies equally to any features of the rivnut 110 shown in FIG. 6 that are identified with a corresponding 100 series reference numeral as if the relevant description is fully repeated herein and directed to FIG. 6. Therefore, the rivnut 110 includes a single-piece body 124, a central opening 130, an axis of rotation 132, a passageway 140, a second central opening 142, an interior surface 144 that defines a counterbore 146, and an interior surface 148 in the form of a threading 150 that defines an internally threaded bore 152. Additionally, it should be understood that the rivnut installation method describe above is performed in the same manner regardless of which rivnut 10, 110 is used to fasten together the workpieces 20 of the workpiece 12.

Referring now specifically to FIG. 6, the rivnut 110 shown there is externally threaded. In particular, the upper wall portion 136 of the hollow shaft 128 has an exterior surface 182, and, likewise, the lower wall portion 138 of the hollow shaft 128 has an exterior surface 184. The exterior surfaces 182, 184 may be aligned to provide the hollow shaft 128 with a constant outer diameter down the entire length of the shaft 128, but they do not necessarily have to coordinated in that fashion. At least a portion of the exterior surface 182 of the upper wall portion is in the form of an external threading 186, which, preferably, is a helical threading. Indeed, in one implementation, and as shown specifically in FIG. 6, both the exterior surface 182 of the upper wall portion 136 and the exterior surface 184 of the lower wall portion 138 are in the form of the external threading 186 so as to define a single continuous helical external threading that extends all the way from the head 126 of the rivnut 110 to the free end 134 of the hollow shaft 128. The external threading 186—regardless of whether is spans only a portion of the upper wall portion 136 or the entire upper and lower wall portions 136, 138—provides the rivnut 110 with the added ability to interlock with the interior portion of the workpiece 12 that defines the hole 70 as the rivnut 10 is rotated and moved through the workpiece 12 during formation of the hole 70.

The interlocking of the rivnut 110 and the workpiece 12 can supplement the compressive force 78 that will be exerted on the workpiece 12 by the head 126 of the rivnut 110 and the radially outwardly extending bulge (not shown) that is formed during collapse of the upper wall portion 136 as described above. The interlocking action occurs when the external threading 186 is scribed into the surrounding workpiece 12 and, in particular, the surrounding softened portion of the substrate layer(s) 20 that are composed of a low ductility material, as the mandrel 56 rotates the rivnut 110 into and through the workpiece 12. The external threading 186 essentially intrudes into and intermeshes with the surrounding portion of the workpiece 12 to further constrain axial movement of the rivnut 110. Moreover, even if some slight cracking or delamination occurs in the workpiece 12 in the surrounding vicinity of the rivnut 110, the interlocking provided by the external threading 186 of the rivnut 110 can mitigate the adverse consequences of such damage by grasping and compressing the substrate layer(s) 20 from within the workpiece 12 adjacent to the location where the damage has initiated.

The rivnut 110 may be installed in the workpiece 12 using techniques other than the rivnut installation method described above in connection with FIGS. 1-5. For example, a hole may be pre-formed through the workpiece 12 by drilling, punching, or some other procedure. The rivnut 110 may then be pushed or rotated through the pre-formed hole until the head 126 of the rivnut 110 engages and is seated against the front side 16 of the workpiece 12 and the hollow shaft 128 extends through the hole beyond the back side 18 of the workpiece 12. Once the rivnut 110 is seated in place and the hollow shaft 128 extends through the hole, the rivnut 110 is upset to collapse the upper wall portion 136 of the hollow shaft 128 and, subsequently, the mandrel 56 is withdrawn. The retraction of the rivnut 110 and the withdrawal of the mandrel 56 are performed in the same manner as described above, respectively, in connection with FIGS. 4-5 of the rivnut installation method of the present disclosure. And while the rivnut 110 is particularly useful in conjunction with a workpiece that includes at least one substrate layer composed of a low ductility material, its use is not necessarily restricted only to those types of workpieces. The rivnut 110 may also be installed in a workpiece that does not include a substrate layer composed of low ductility material as described above including, for instance, a workpiece in which the substrate layer 20 or each of the two or more overlapping substrate layers 20 is composed of a metal.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of installing a rivet nut, the method comprising:

providing a workpiece that has a front side and an opposed back side and includes one or more substrate layers at an installation location;

inserting an externally threaded mandrel through a hollow shaft of a rivet nut to establish a threaded engagement between the externally threaded mandrel and an internally threaded bore defined by a lower wall portion of a hollow shaft of the rivet nut, the hollow shaft further including an upper wall portion extending between a head of the rivet nut and the lower wall portion of the hollow shaft, wherein a leading end of the externally threaded mandrel extends through the hollow shaft of the rivet nut and protrudes beyond a free end of the hollow shaft, and wherein each of the upper wall portion and the lower wall portion of the hollow shaft has an exterior surface, at least a portion of the exterior surface of the upper wall portion being in the form of an external threading;

rotating the mandrel together with the rivet nut while the leading end of the mandrel that protrudes beyond the free end of the hollow shaft of the rivet nut is in contact with the front side of the workpiece at the installation location;

driving the leading end of the mandrel into and through the workpiece in an insertion direction while continuing to rotate the mandrel until a hole is formed through the workpiece and the head of the rivet nut engages the front side of the workpiece; and retracting the mandrel in a reverse direction opposite the insertion direction while the head of the rivet nut is held against the front side of the workpiece to collapse the upper wall portion of the rivet nut into a radially outwardly extending bulge that bears on the back side of the workpiece, the head of the rivet nut and the radially outwardly extending bulge exerting a compressive force against the workpiece at the installation location.

2. The method set forth in claim 1, wherein the head comprises a flat or countersunk flange that surrounds and extends radially outwardly from the hollow shaft.

3. The method set forth in claim 1, wherein the workpiece is a single substrate layer composed of a low ductility material having an elongation of less than 3%.

4. The method set forth in claim 3, wherein the single substrate layer is composed of a polymer composite that comprises a thermoplastic resin polymer matrix reinforced with embedded fibers.

5. The method set forth in claim 1, wherein the workpiece includes two or more overlapping substrate layers at the installation location, and wherein at least one of the two or more overlapping substrate layers is composed of a low ductility material having an elongation of less than 3%.

6. The method set forth in claim 5, wherein all of the two or more overlapping substrate layers is composed of the low ductility material.

7. The method set forth in claim 6, wherein all of the two or more overlapping substrate layers is composed of a polymer composite that comprises a thermoplastic resin polymer matrix reinforced with embedded fibers.

8. The method set forth in claim 1, wherein the leading end of the mandrel is radially inwardly tapered.

9. A method of installing a rivet nut, the method comprising:

providing a workpiece that has a front side and an opposed back side and includes one or more substrate layers at an installation location;

inserting an externally threaded mandrel through a hollow shaft of a rivet nut to establish a threaded engagement between the externally threaded mandrel and an internally threaded bore defined by a lower wall portion of a hollow shaft of the rivet nut, the hollow shaft further including an upper wall portion extending between a head of the rivet nut and the lower wall portion of the hollow shaft, wherein a leading end of the externally threaded mandrel extends through the hollow shaft of the rivet nut and protrudes beyond a free end of the hollow shaft, and wherein each of the exterior surface of the upper wall portion and the exterior surface of the lower wall portion is in the form of a helical external threading so as to define a single continuous helical external threading extending all the way from the head to the free end of the hollow shaft;

rotating the mandrel together with the rivet nut while the leading end of the mandrel that protrudes beyond the free end of the hollow shaft of the rivet nut is in contact with the front side of the workpiece at the installation location;

driving the leading end of the mandrel into and through the workpiece in an insertion direction while continuing to rotate the mandrel until a hole is formed through the workpiece and the head of the rivet nut engages the front side of the workpiece; and retracting the mandrel in a reverse direction opposite the insertion direction while the head of the rivet nut is held against the front side of the workpiece to collapse the upper wall portion of the rivet nut into a radially outwardly extending bulge that bears on the back side of the workpiece, the head of the rivet nut and the radially outwardly extending bulge exerting a compressive force against the workpiece at the installation location.

10. A method of installing a rivet nut, the method comprising:

providing a workpiece that has a front side and an opposed back side and includes one or more substrate layers at an installation location, wherein the workpiece is a single substrate layer composed of a low ductility material having an elongation of less than 3%;

inserting an externally threaded mandrel through a hollow shaft of a rivet nut to establish a threaded engagement between the externally threaded mandrel and an internally threaded bore defined by a lower wall portion of a hollow shaft of the rivet nut, the hollow shaft further including an upper wall portion extending between a head of the rivet nut and the lower wall portion of the hollow shaft, and wherein a leading end of the externally threaded mandrel extends through the hollow shaft of the rivet nut and protrudes beyond a free end of the hollow shaft;

rotating the mandrel together with the rivet nut while the leading end of the mandrel that protrudes beyond the free end of the hollow shaft of the rivet nut is in contact with the front side of the workpiece at the installation location;

driving the leading end of the mandrel into and through the workpiece in an insertion direction while continuing to rotate the mandrel until a hole is formed through the workpiece and the head of the rivet nut engages the front side of the workpiece, wherein when driving the leading end of the mandrel into and through the workpiece, the external threading of the hollow shaft of the rivet nut interlocks with the workpiece as the rivet nut rotates and is moved through the hole formed through the workpiece, and the substrate layer composed of a low ductility material is heated and softened as the leading end of the mandrel is driven therethrough; and retracting the mandrel in a reverse direction opposite the insertion direction while the head of the rivet nut is held against the front side of the workpiece to collapse the upper wall portion of the rivet nut into a radially outwardly extending bulge that bears on the back side of the workpiece, the head of the rivet nut and the radially outwardly extending bulge exerting a compressive force against the workpiece at the installation location.

* * * * *